United States Patent
Deng et al.

(10) Patent No.: US 11,695,328 B2
(45) Date of Patent: Jul. 4, 2023

(54) CONTROL CIRCUIT AND SWITCHING CONVERTER

(71) Applicant: Silergy Semiconductor Technology (Hangzhou) LTD, Hangzhou (CN)

(72) Inventors: Jian Deng, Hangzhou (CN); Jin Jin, Hangzhou (CN); Xuecheng Tian, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 51 days.

(21) Appl. No.: 17/319,267

(22) Filed: May 13, 2021

(65) Prior Publication Data

US 2021/0367507 A1    Nov. 25, 2021

(30) Foreign Application Priority Data

May 22, 2020  (CN) .......................... 202010440029.7

(51) Int. Cl.
*H02M 3/156* (2006.01)
*H02M 1/42* (2007.01)
*H02M 1/12* (2006.01)

(52) U.S. Cl.
CPC .......... *H02M 1/4225* (2013.01); *H02M 1/12* (2013.01); *H02M 3/156* (2013.01)

(58) Field of Classification Search
None
See application file for complete search history.

(56) References Cited

U.S. PATENT DOCUMENTS

| | | | |
|---|---|---|---|
| 6,005,780 A | 12/1999 | Hua | |
| 6,580,258 B2 | 6/2003 | Wilcox et al. | |
| 9,325,254 B2 | 4/2016 | Deng et al. | |
| 9,331,588 B2* | 5/2016 | Chen | H02M 3/33523 |
| 9,488,680 B2 | 11/2016 | Xu | |
| 9,627,992 B2* | 4/2017 | Chen | H02M 1/4266 |
| 10,291,109 B2* | 5/2019 | Huang | H02M 7/797 |
| 2012/0169313 A1 | 7/2012 | Lee | |
| 2014/0078789 A1 | 3/2014 | Li et al. | |
| 2014/0239934 A1 | 8/2014 | Zhang | |
| 2015/0160270 A1 | 6/2015 | Shi et al. | |
| 2015/0280578 A1 | 10/2015 | Huang et al. | |
| 2019/0116637 A1* | 4/2019 | Wang | H05B 45/385 |
| 2021/0091678 A1 | 3/2021 | Wang | |
| 2021/0111638 A1* | 4/2021 | Araumi | H02M 1/44 |

FOREIGN PATENT DOCUMENTS

| | | |
|---|---|---|
| CN | 102231605 A | 11/2011 |
| CN | 103280965 A | 9/2013 |
| CN | 106130378 A | 11/2016 |
| CN | 107968569 A | 4/2018 |

* cited by examiner

*Primary Examiner* — Jeffrey A Gblende (57) ABSTRACT

A control circuit for a switching converter, can include: a current compensation signal generating circuit configured to generate a current compensation signal based on a current sampling signal representing an inductor current; and a control signal generating circuit configured to adjust a current control parameter of a current control loop in the switching converter according to the current compensation signal, in order to increase power factor (PF) and reduce total harmonic distortion (THD).

17 Claims, 7 Drawing Sheets

CONTROL CIRCUIT AND SWITCHING CONVERTER

RELATED APPLICATIONS

This application claims the benefit of Chinese Patent Application No. 202010440029.7, filed on May 22, 2020, which is incorporated herein by reference in its entirety.

FIELD OF THE INVENTION

The present invention generally relates to the field of power electronics, and more particularly to control circuits and associated switching converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Among various switching converters, power factor (PF) and total harmonic distortion (THD) are important electrical indicators. A power factor correction (PFC) circuit is usually used to eliminate or reduce the phase difference between an input voltage and an input current of the switching converter, in order to increase PF and improve THD. The PFC circuit is typically a boost PFC circuit. However, when the switching converter operate in different conduction modes, an error current can be generated inside the switching converter, which may affect an inductor current of the switching converter. Therefore, the PFC circuit may not provide better PF and THD, thereby limiting applications of the switching converter.

For example, when the switching converter is changed from a continuous conduction mode (CCM) to a discontinuous conduction mode (DCM) or a boundary conduction mode (BCM), a resonant negative current can be generated due to the resonance generated by the parasitic capacitor and inductor of the switching converter when the inductor current crosses zero. Also, when a main power switch of the switching converter is turned on and a diode of the switching converter switches from an on-state to an off-state, a diode reverse recovery current can be generated. Both the resonant negative current and the diode reverse recovery current can reduce the inductor current, and the input current may not follow the input voltage well, and may no longer be a sinusoidal curve, thereby resulting in lower PF and higher THD.

Figure 1A:
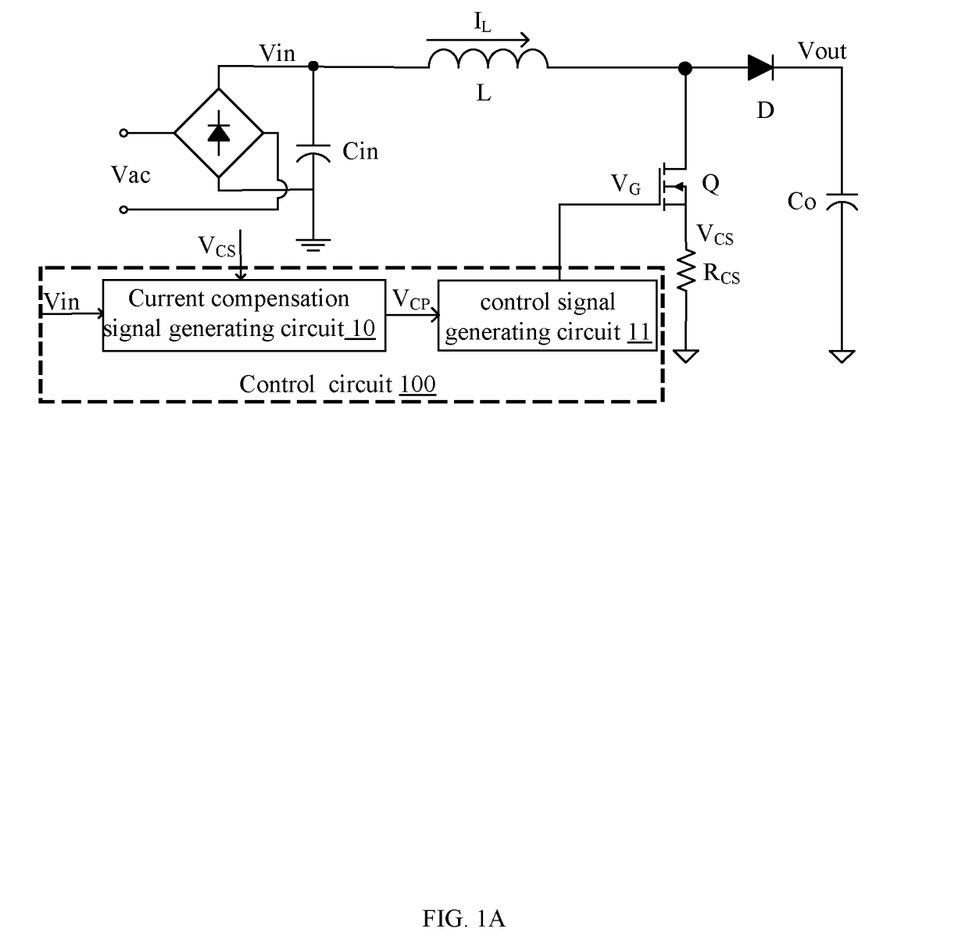
FIG. 1A is a schematic block diagram of an example switching converter, in accordance with embodiments of the present invention.

Referring now to FIG. 1A, shown is a schematic block diagram of an example switching converter, in accordance with embodiments of the present invention. In this embodiment, a boost switching converter is taken as an example for description. In this particular example, this switching converter can include a rectifier bridge, a power stage circuit, and control circuit 100. The rectifier bridge can receive AC voltage Vac and may generate input voltage Vin in the form of a rectified half sinusoidal wave. The power stage circuit can receive input voltage Vin at an input terminal, and may generate adjustable output voltage Vout at an output terminal. The power stage circuit can include inductor L connected to the input terminal, main power switch Q coupled to inductor L, diode D coupled to inductor L, and an output capacitor connected to the output terminal, in order to generate output voltage Vout across the output capacitor.

In one embodiment, control circuit 100 can be an integrated circuit with its own package and related input and output pins, and may be mounted on a printed circuit board with circuit components of the switching converter, or mounted on a single printed circuit board of the corresponding integrated circuit. Further, control circuit 100 can include a first input pin for receiving input voltage Vin, a second input pin for receiving current sampling signal Vcs representing inductor current $I_L$ flowing through inductor L, and an output pin for generating driving signal $V_G$. In this embodiment, driving signal $V_G$ can control main power switch Q to be turned on and off in an appropriate timing sequence, in order to realize the adjustment of output voltage Vout.

In particular embodiments, control circuit 100 can adopt different control modes to control main power switch Q to switch between the on-state and the off-state. For example, when control circuit 100 adopts a peak current control mode, control circuit 100 can generate a current reference signal of the current control loop according to an input voltage sampling signal characterizing input voltage Vin, and may generate driving signal $V_G$ according to current sampling signal $V_{CS}$ characterizing inductor current $I_L$ and the current reference signal to adjust the conduction time of main power switch Q, in order to realize the adjustment of output voltage Vout. When the control circuit adopts a constant on-time control mode, control circuit 100 can generate a feedback error signal of the current control loop according to an error between an output feedback signal representing output voltage Vout and a voltage reference signal, and may generate driving signal $V_G$ according to the feedback error signal and a ramp signal, in order to control main power switch Q to switch between the on-state with a constant conduction time and the off-state.

Figure 1B:
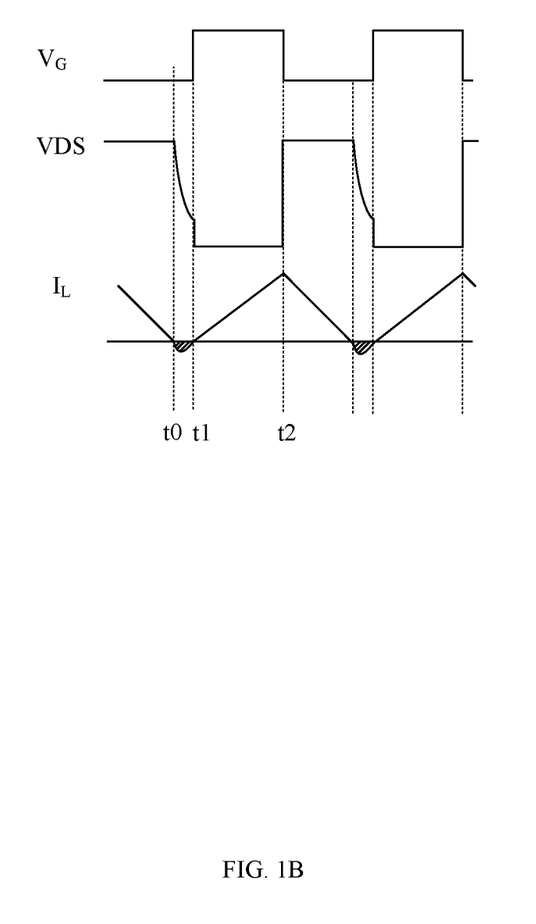
FIG. 1B is a waveform diagram of example operation of a switching converter, in accordance with embodiments of the present invention.

Referring now to FIG. 1B, shown is a waveform diagram of example operation of a switching converter in accordance with embodiments of the present invention. In this particular example, the switching converter adopts quasi-resonant control to realize average current control, and main power switch Q can be controlled to be turned on and off by driving signal $V_G$. When the switching converter operates in a discontinuous conduction mode (DCM), and inductor current $I_L$ approaches to zero at time t0 and is gradually less than zero, drain-source voltage VDS of main power switch Q can begin to resonate. At time t1, control circuit 100 can generate effective driving signal $V_G$ at the resonant valley of drain-source voltage VDS to control main power switch Q to turn on. At time t2, driving signal $V_G$ may switch to an inactive signal to control main power switch Q to turn off.

In other approaches, when inductor current $I_L$ crosses zero, the internal electrical components in the switching converter may interact to generate an error current. For example, during time period t0-t1, when inductor current $I_L$ crosses zero, the parasitic capacitor and the inductor of main power switch Q can resonate, and a resonant negative current may be generated. Also, when main power switch Q is turned on and diode D switches from an on-state to an off state, a diode reverse recovery current may be generated. In this way, an error current including the resonant negative current and the diode reverse recovery current can reduce inductor current $I_L$. In addition, since the switching converter adopts the average current control, the current control parameter of the current control loop can be decreased, such that input current Iin is distorted, and input current Iin may not follow input voltage Vin, resulting in poor PF and THD.

In one embodiment, control circuit 100 can include current compensation signal generating circuit 10 and control signal generating circuit 11. Current compensation signal generating circuit 10 can receive current sampling signal $V_{CS}$ representing the average value of inductor current $I_L$, and may generate current compensation signal $V_{CP}$ based on current sampling signal $V_{CS}$. Control signal generating circuit 11 can compensate a current control parameter of the current control loop according to current compensation signal $V_{CP}$, in order to achieve average current control, and to effectively increase PF and reduce THD. In this embodiment, since inductor current $I_L$ of the switching converter is actually essentially consistent with input current Iin, inductor current $I_L$ can be adjusted by adjusting inductor current $I_L$ through the current control loop, thereby eliminating the distortion of input current Iin that may be caused by the error current.

In particular embodiments, current compensation signal generating circuit 10 can sample inductor current $I_L$, and may obtain the error between current sampling signal $V_{CS}$ and current reference signal $V_{IN,\ REF}$ in order to generate current compensation signal $V_{CP}$. Also, control signal generating circuit 11 can compensate the current control parameter of the current control loop based on current compensation signal $V_{CP}$, in order to adjust the conduction time of main power switch Q, thereby compensating the distortion of input current Iin of the switching converter caused by the error current. In this way, input current Iin can follow input voltage Vin well, and PF and THD may be improved. It should be understood that resistor $R_{CS}$ connected in series between main power switch Q and a reference ground can be utilized to sample inductor current $I_L$ to generate current sampling signal $V_{CS}$ that represents the average value of inductor current $I_L$ in order to achieve current average control. Further, other circuit structures that can realize the above-mentioned functions can additionally or alternatively be utilized in certain embodiments.

Further, current reference signal $V_{IN,\ REF}$ (see, e.g., FIG. 2A) for comparison against current sampling signal $V_{CS}$ can be generated by a voltage control loop. In one embodiment, control circuit 100 can amplify a difference between output feedback signal $V_{FB}$ representing output voltage Vout and the voltage reference signal, in order to obtain a feedback error signal. The feedback error signal can be multiplied with the input sampling signal representing input voltage Vin, in order to generate current reference signal $V_{IN,\ REF}$. Therefore, under control of current reference signal $V_{IN,\ REF}$, control signal generating circuit 11 can control the on and off states of main power switch Q, such that input current Iin follows the phase change of input voltage Vin, and the output voltage or the output current can be maintained at a value set by the voltage reference signal.

Figure 2A:
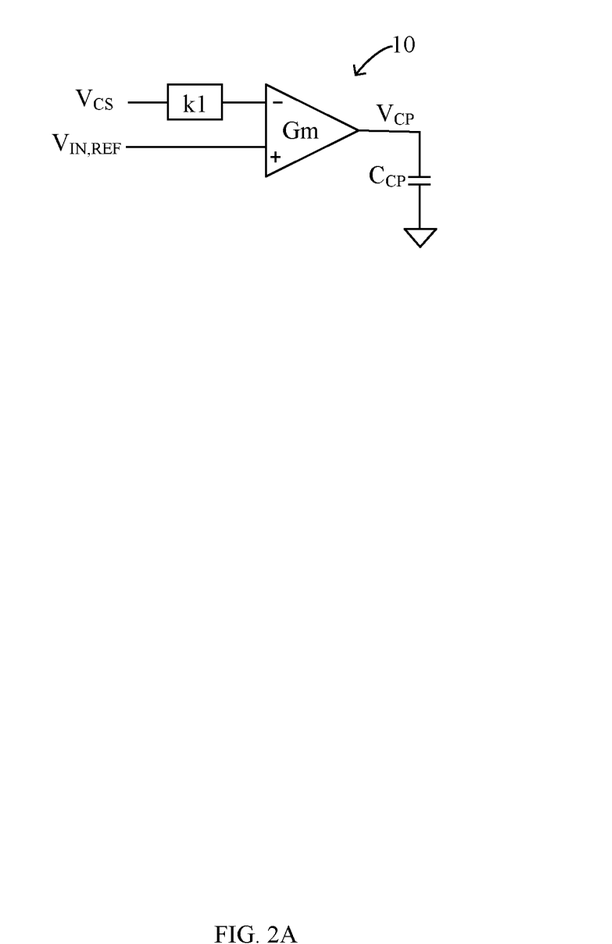
FIG. 2A is a schematic block diagram of a first example current compensation signal generating circuit, in accordance with embodiments of the present invention.

Referring now to FIG. 2A, shown is a schematic block diagram of a first example current compensation signal generating circuit, in accordance with embodiments of the present invention. In this particular example, current compensation signal generating circuit 10 can include transconductance amplifier Gm having a first input terminal (e.g., an inverting input terminal) for receiving current sampling signal $V_{CS}$, a second input terminal (e.g., a non-inverting input terminal) for receiving current reference signal $V_{IN,\ REF}$, and an output terminal for generating current compensation signal $V_{CP}$. In other embodiments, current compensation signal generating circuit 10 can also include a compensation network, such as capacitor Co) coupled to the output terminal of transconductance amplifier Gm. Current compensation signal generating circuit 10 can also include proportional coefficient unit kl connected to the first input terminal of transconductance amplifier Gm, and may perform a proportional conversion on current sampling signal $V_{CS}$.

Figure 2B:
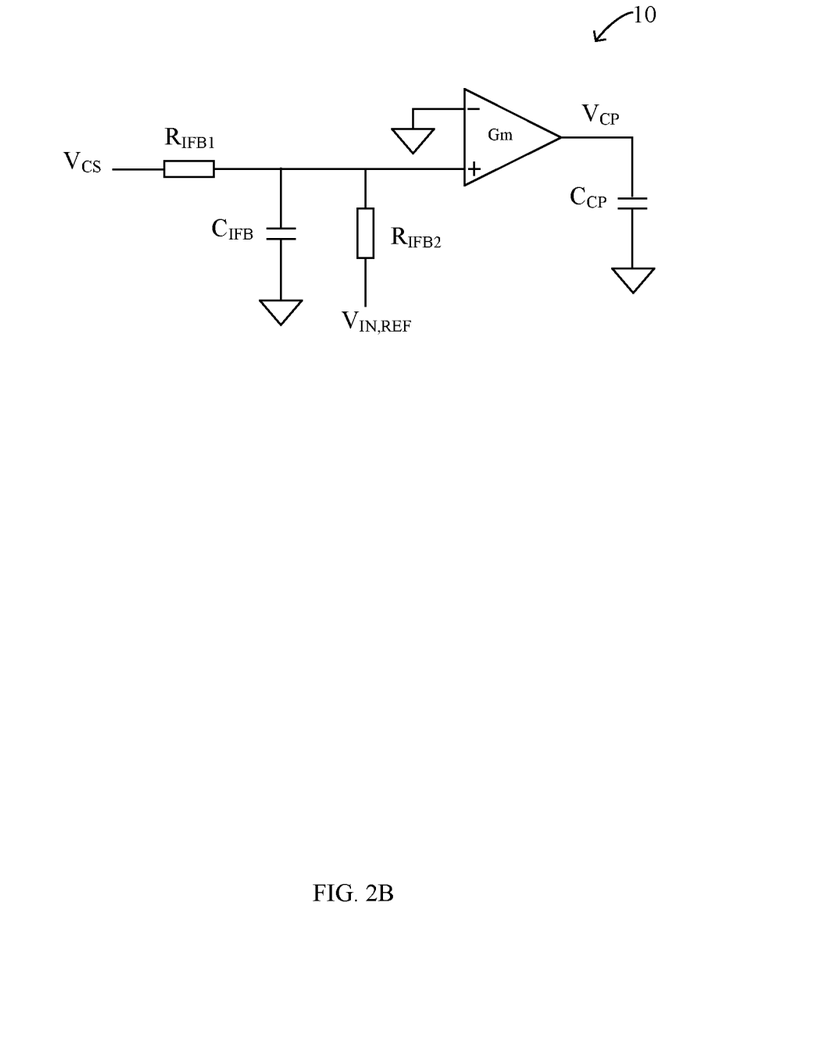
FIG. 2B is a schematic block diagram of a first example current compensation signal generating circuit in accordance with embodiments of the present invention.

Referring now to FIG. 2B, shown is a schematic block diagram of a first example current compensation signal generating circuit, in accordance with embodiments of the present invention. In this particular example, current compensation signal generating circuit 10 can include transconductance amplifier Gm having a first input terminal (e.g., an inverting input terminal) connected to the reference ground, a second input terminal (e.g., a non-inverting input terminal) for receiving current reference signal $V_{IN,\ REF}$ and current sampling signal $V_{CS}$, and an output terminal for generating current compensation signal $V_{CP}$. Further, current sampling signal $V_{CS}$ can be filtered by a filter network to generate a filter signal, and the difference between the filter signal and current reference signal $V_{IN,\ REF}$ can be generated through resistor $R_{IFB2}$ connected to the second input terminal of transconductance amplifier Gm.

The filter network can include resistor $R_{IFB1}$ and capacitor $C_{IFB}$ connected in series between current sampling signal $V_{CS}$ and the reference ground. A first terminal of resistor $R_{IFB2}$ can connect to the common terminal of resistor $R_{IFB1}$ and capacitor $C_{IFB}$, that is, the second input terminal of transconductance amplifier Gm, and a second terminal of resistor $R_{IFB2}$ can receive current reference signals $V_{IN, REF}$. In one embodiment, current compensation signal generating circuit 10 can also include a compensation network, such as capacitor $C_{CP}$ coupled to the output terminal of transconductance amplifier Gm. In particular embodiments, control circuit 100 can adopt different control modes to control main power switch Q to switch between the on-state and the off-state, such as the peak current control mode and the constant on-time control mode.

Figure 3:
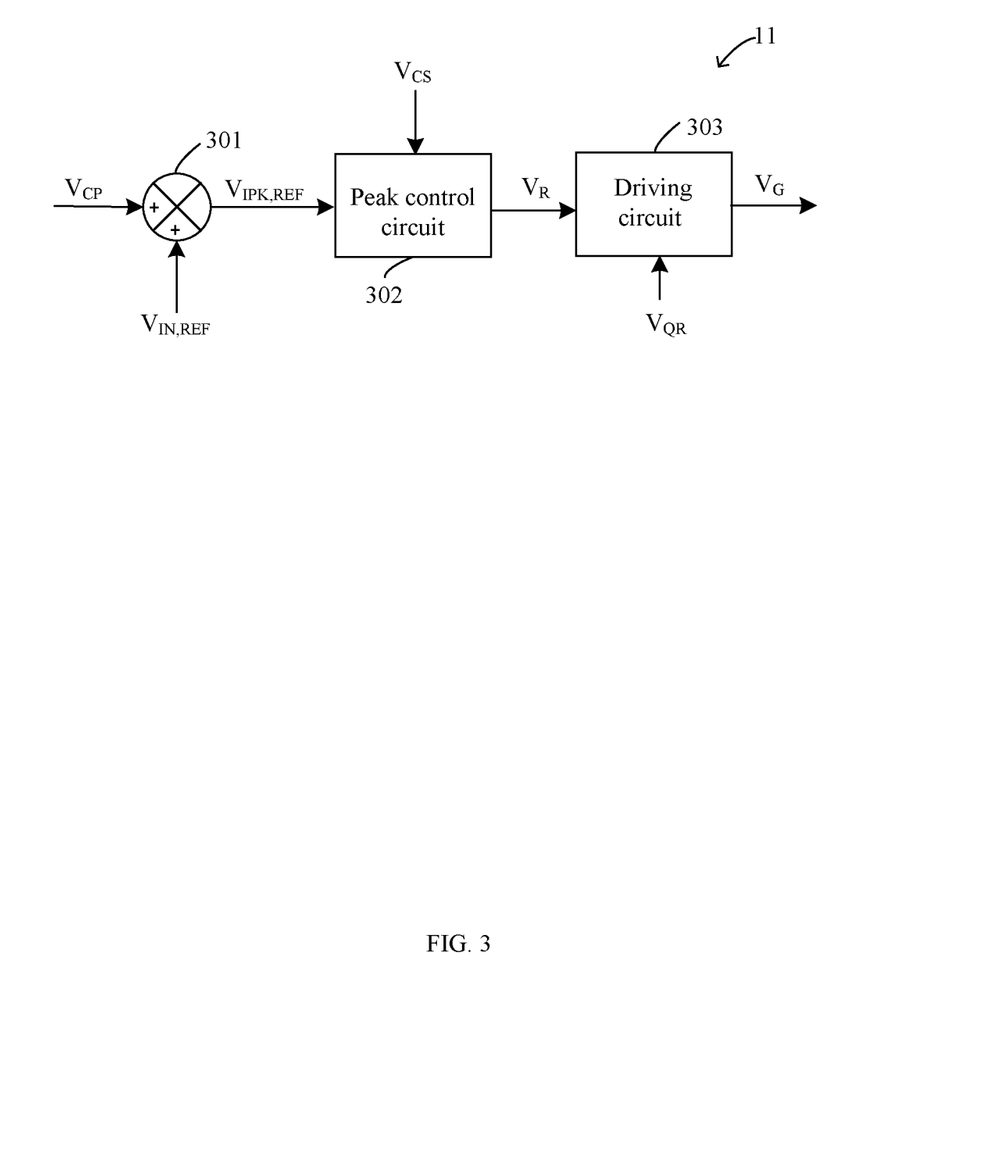
FIG. 3 is a schematic block diagram of a first example control signal generating circuit, in accordance with embodiments of the present invention.

Referring now to FIG. 3, shown is a schematic block diagram of a first example control signal generating circuit, in accordance with embodiments of the present invention. In this particular example, control signal generating circuit 11 adopts the peak current control mode. In this embodiment, the current control parameter of the current control loop can be configured as current reference signal $V_{IN, REF}$. Control signal generating circuit 11 can modify current reference signal $V_{IN, REF}$ according to current compensation signal $V_{CP}$ to generate peak current reference signal $V_{IN, REF}$, and to adjust the conduction time of main power switch Q according to peak current reference signal $V_{IN, REF}$ and current sampling signal $V_{CS}$, in order to adjust output voltage Vout.

In this embodiment, control signal generating circuit 11 can include adder 301 and peak control circuit 302. Adder 301 can add a correction value proportional to current compensation signal $V_{CP}$ to current reference signal $V_{IN, REF}$, in order to generate peak current reference signal $V_{IN, REF}$. Peak control circuit 302 can compare peak current reference signal VIM, REF against current sampling signal $V_{CS}$ to generate reset signal $V_R$ to adjust the conduction time of main power switch Q. That is, to adjust the end moment of the conduction time of main power switch Q and the start moment of the off time of main power switch Q, such that the peak value of inductor current $I_L$ is determined by peak current reference signal $V_{IN, REF}$. Further, control signal generating circuit 11 can include driving circuit 303 for generating driving signal $V_G$ according to reset signal $V_R$ and detection signal $V_QR$ that characterizes the resonant valley of the drain-source voltage of main power switch Q.

When detection signal $V_QR$ is active, main power switch Q can be turned on, and when current sampling signal $V_{CS}$ reaches peak current reference signals $V_{IN, REF}$, peak control circuit 302 can activate reset signal $V_R$ to control main power switch Q to be turned off. It should be understood that driving circuit 303 in this example adopts frequency conversion resonant control to realize average current control, and controls the turn-on moment of main power switch Q according to detection signal $V_{QR}$. Other circuit structures that can realize the above functions can alternatively or additionally be used in certain embodiments. For example, driving circuit 303 may adopt constant frequency control, and can control the turn-on moment of main power switch Q by a clock signal.

Figure 4:
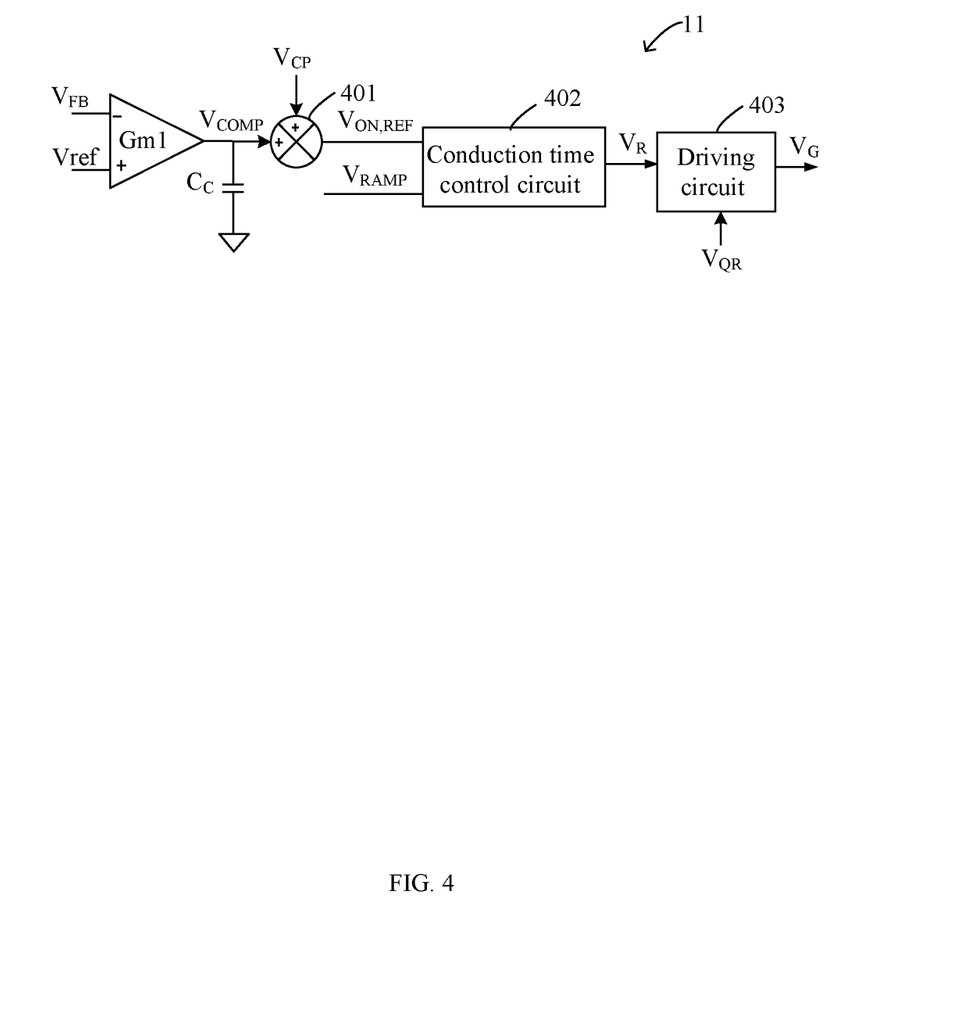
FIG. 4 is a schematic block diagram of a second example control signal generating circuit, in accordance with embodiments of the present invention.

Referring now to FIG. 4, shown is a schematic block diagram of a second example control signal generating circuit, in accordance with embodiments of the present invention. In this particular example, control signal generating circuit 11 adopts the constant on-time control mode. In this embodiment, the current control parameter of the current control loop can be configured as feedback error signal $V_{comp}$. Control signal generating circuit 11 can modify feedback error signal $V_{comp}$ according to current compensation signal $V_{CP}$ to generate conduction time reference signal $V_{ON, REF}$, and to adjust the conduction time of main power switch Q according to conduction time reference signals $V_{ON, REF}$, in order to adjust output voltage Vout. Here, feedback error signal $V_{COMP}$ may be obtained by amplifying the difference between output feedback signal $V_{FB}$ representing output voltage Vout and voltage reference signal Vref.

In one embodiment, control signal generating circuit 11 can include transconductance amplifier Gm1 having a first input terminal (e.g., an inverting input terminal) for receiving output feedback signal $V_{FB}$, a second input terminal (e.g., a non-inverting input terminal) for receiving voltage reference signal Vref, and an output terminal for generating feedback error signal $V_{COMP}$ according to the difference between output feedback signal $V_{FB}$ and voltage reference signal Vref. Control signal generating circuit 11 can also include a compensation network, such as capacitor $C_C$ is coupled to the output terminal of transconductance amplifier Gm1 to compensate feedback error signal $V_{COMP}$.

Control signal generating circuit 11 can also include adder 401 and conduction time control circuit 402. Adder 401 can add a correction value proportional to current compensation signal $V_{CP}$ to feedback error signal $V_{COMP}$, in order to generate conduction time reference signal $V_{ON, REF}$. Conduction time control circuit 402 can generate reset signal $V_R$ by comparing conduction time reference signals $V_{ON, REF}$ against ramp signal $V_{RAMP}$ to adjust the conduction time of main power switch Q. That is, to adjust the end moment of the conduction time of main power switch Q and the start moment of the off time of main power switch Q. Further, control signal generating circuit 11 can include driving circuit 403 for generating driving signal $V_G$ according to reset signal $V_R$ and detection signal $V_{QR}$ that characterizes the resonant valley of the drain-source voltage of main power switch Q.

When detection signal $V_{QR}$ is active, main power switch Q can be turned on, and when ramp signal $V_{RAMP}$ rises from zero to conduction time reference signal $V_{ON, REF}$, conduction time control circuit 402 can activate reset signal $V_R$ to control main power switch Q to be turned off. It should be understood that driving circuit 403 in this embodiment controls the conduction time of main power switch Q according to detection signal $V_{QR}$. Other circuit structures that can realize the above functions can alternatively or additionally be used in certain embodiments. For example, driving circuit 403 can adopt constant frequency control, and control the turn-on moment of main power switch Q by a clock signal.

Figure 5:
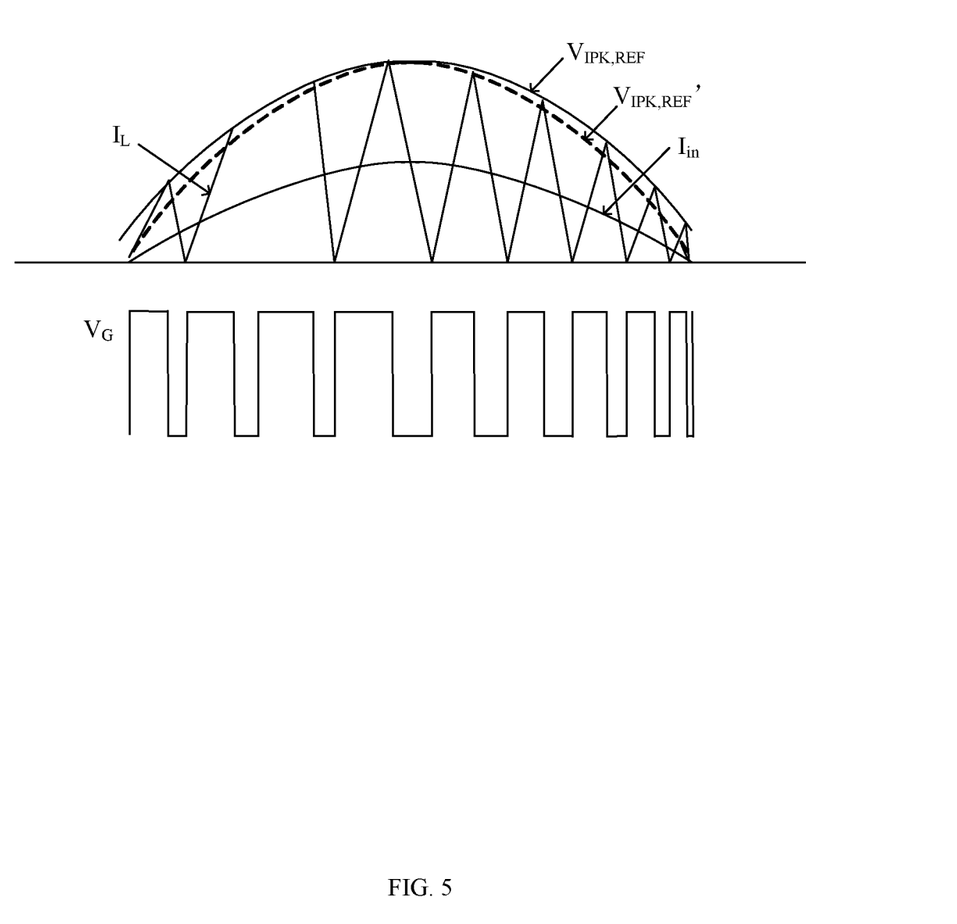
FIG. 5 is a waveform diagram of another example operation of a switching converter, in accordance with embodiments of the present invention.

Referring now to FIG. 5, shown is a waveform diagram of another example operation of a switching converter in accordance with embodiments of the present invention. In this particular example, the switching converter is a boost switching converter, the control signal generation circuit adopts the peak current control mode, input current Iin is the average value of inductor current $I_L$, and the average value of inductor current $I_L$ is half of the peak value of inductor current $I_L$. Since inductor current $I_L$ flows both during the conduction time and the off-time of main power switch Q, the waveform of inductor current $I_L$ is a series of continuous triangular waves.

The waveform of peak current reference signal $V_{IPK, REF}$ can be generated after current reference signals $V_{IN, REF}$ is modified by current compensation signal $V_{CP}$, and the waveform of $V_{IPK, REF'}$ can be directly generated based on current reference signals $V_{IN, REF}$, and may not be modified by current compensation signal $V_{CP}$. In this embodiment, the envelope of the waveform of peak current reference signal $V_{IPK, REF}$ generated after the modification of current compensation signal $V_{CP}$ is sinusoidal, and the peak value of inductor current $I_L$ can well follow peak current reference signal $V_{IPK, REF}$. As such, the waveform of input current Iin is sinusoidal, and input current Iin is proportional to the envelope of peak current reference signal $V_{IPK, REF}$, thereby significantly reducing the distortion of the waveform and greatly improving PF and THD.

In this way, particular embodiments can modify the current control parameter of the current control loop by the current compensation signal, and adjust the conduction time of the main power switch according to the modified current control parameter, thereby effectively eliminating the influence of the error current on the input current, and obtaining higher PF and lower THD.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit for a switching converter, the control circuit comprising:
    a) a current compensation signal generating circuit configured to generate a current compensation signal based on a current sampling signal representing an inductor current; and
    b) a control signal generating circuit configured to add a correction value that is proportional to the current compensation signal to a current control parameter of a current control loop in the switching converter to adjust a conduction time of a main power switch, in order to increase power factor (PF) and reduce total harmonic distortion (THD).

2. The control circuit of claim 1, wherein the current compensation signal generating circuit is configured to generate the current compensation signal based on an error between the current sampling signal and a current reference signal, and to adjust a conduction time of a main power switch of the switching converter based on the current compensation signal.

3. The control circuit of claim 1, wherein a conduction time of the main power switch of the switching converter is based on the current compensation signal.

4. The control circuit of claim 1, wherein the control signal generating circuit is configured to adjust a current reference signal according to the current compensation signal to generate a peak current reference signal, and to adjust a conduction time of a main power switch of the switching converter according to the peak current reference signal and the current sampling signal, wherein the current reference signal is configured as the current control parameter.

5. The control circuit of claim 4, wherein the control signal generating circuit is configured to superimpose the correction value proportional to the current compensation signal on the current reference signal.

6. The control circuit of claim 1, wherein the control signal generating circuit is configured to generate a diving signal to control a main power switch of the switching converter according to the current compensation signal and a detection signal that characterizes a resonant valley of a drain-source voltage of the main power switch, wherein during a conduction time of the main power switch, the inductor current flows in an inductor to store energy in the inductor, and during an off-time of the main power switch, energy is transferred from the inductor to a load of the switching converter.

7. The control circuit of claim 1, wherein the current compensation signal generating circuit comprises:
    a) a transconductance amplifier having a first input terminal for receiving the current sampling signal, a second input terminal for receiving a current reference signal and an output terminal for generating the current compensation signal;
    b) a compensation network coupled to the output terminal of the transconductance amplifier; and
    c) wherein the current reference signal is generated according to an input voltage of the switching converter.

8. The control circuit of claim 7, wherein the control signal generating circuit comprises:
    a) an adder configured to add a correction value proportional to the current compensation signal to the current reference signal to generate a peak current reference signal; and
    b) a peak control circuit configured to control a main power switch of the switching converter according to the peak current reference signal and the current sampling signal.

9. The control circuit of claim 7, wherein the control signal generating circuit comprises:
    a) an adder configured to add a correction value proportional to the current compensation signal to a feedback error signal to generate a conduction time reference signal;
    b) a conduction time control circuit configured to control a main power switch of the switching converter according to the conduction time reference signal and a ramp signal; and
    c) wherein the feedback error signal represents an error between an output feedback signal representing an output voltage of the switching converter and a voltage reference signal.

10. The control circuit of claim 2, wherein the current reference signal is generated by a product of a feedback error signal and an input sampling signal that characterizes an input voltage of the switching converter, and the feedback error signal represents an error between an output feedback signal representing an output voltage of the switching converter and a voltage reference signal.

11. The control circuit of claim 1, wherein the control signal generating circuit is configured to superimpose, by an adder, a correction value proportional to the current compensation signal on the current control parameter, in order to adjust a conduction time of a main power switch of the switching converter.

12. An apparatus, comprising the switching converter and the control circuit of claim 1, wherein the switching converter comprises:
    a) a power stage circuit having a main power switch coupled to an inductor for receiving an input voltage and an input current; and
    b) a load coupled to the inductor, and being configured to receive an output voltage.

13. The apparatus of claim 12, wherein the switching converter operates in one of a continuous conduction mode and a discontinuous conduction mode.

14. The apparatus of claim 12, wherein the switching converter comprises a boost converter.

15. The apparatus of claim 12, wherein the control circuit is configured as an integrated circuit having a first input pin for receiving an input voltage, a second input pin for receiving a current sampling signal representing an inductor current, and an output pin coupled to the main power switch.

16. A control circuit of claim 1, for a switching converter, the control circuit comprising:
   a) a current compensation signal generating circuit configured to generate a current compensation signal based on a current sampling signal representing an inductor current; and
   b) a control signal generating circuit configured to adjust a current control parameter of a current control loop in the switching converter according to the current compensation signal, in order to increase power factor (PF) and reduce total harmonic distortion (THD),
   c) wherein the control signal generating circuit is configured to adjust a feedback error signal according to the current compensation signal to generate a conduction time reference signal, and to control a conduction time of a main power switch of the switching converter according to the conduction time reference signal, wherein the feedback error signal is configured as the current control parameter, and represents an error between an output feedback signal representing an output voltage of the switching converter and a voltage reference signal.

17. The control circuit of claim 16, wherein the control signal generating circuit is configured to superimpose a correction value proportional to the current compensation signal on the feedback error signal.

* * * * *